June 6, 1933.   F. H. HIBBARD   1,912,451
VIBRATION ABSORBING MOUNTING
Filed April 20, 1932

INVENTOR
F. H. HIBBARD
BY
ATTORNEY

Patented June 6, 1933

1,912,451

UNITED STATES PATENT OFFICE

FRANK H. HIBBARD, OF MOUNTAIN LAKES, NEW JERSEY, ASSIGNOR TO ELECTRICAL RESEARCH PRODUCTS, INC., OF NEW YORK, N. Y., A CORPORATION OF DELAWARE

VIBRATION ABSORBING MOUNTING

Application filed April 20, 1932. Serial No. 606,308.

This invention relates to vibrations absorbing mountings and the object of the invention is to prevent the transfer of undesirable vibrations, as for example, between driving and driven members of a machine.

It will be readily understood that if these vibrations are not to be transmitted by the mounting its resonant frequency should be remote from that of any of the undesired frequencies. In certain applications, as for example, sound reproducing machines of the type disclosed in my application Serial No. 571,723, filed October 29, 1931, it is necessary to eliminate not only vibrations of relatively high frequencies but also those of lower frequency such as the 60-cycle vibration set up by the power supply to the motor. This requires a mounting having a resonant frequency which is preferably of the order of 5 to 10 cycles. To obtain this with simple helical spring arrangements of well known types the springs would have to be of large diameter and of considerable length which would result in a bulky and very unstable structure.

This difficulty is overcome according to this invention by mounting the motor on flat, preferably U-shaped, springs secured in position by the motor mounting bolts which are provided with short helical springs for adjusting the motor to the correct operating level and compensating for slight variations in the flat springs. This arrangement may be readily designed to have the desired low resonant frequency, it is inherently much more stable than the spiral spring construction and yet it effectively eliminates all extraneous vibrations originating in the motor.

A further feature of the invention which is of particular value in cases where a high degree of lateral stability is necessary is an absorbing member of the type disclosed in Patent 1,778,503 to Lord, January 10, 1927, used in conjunction with the spring arrangement just described. This comprises a ring of rubber secured at its periphery to one side of the flat spring and it its center to the mounting bolt and helical spring. This construction eliminates all metallic connection between the driving and driven members and increases the lateral stability without sacrificing the advantages of the combination spring arrangement.

In the drawing, Fig. 1 shows a motor mounted according to this invention;

Figure 1:
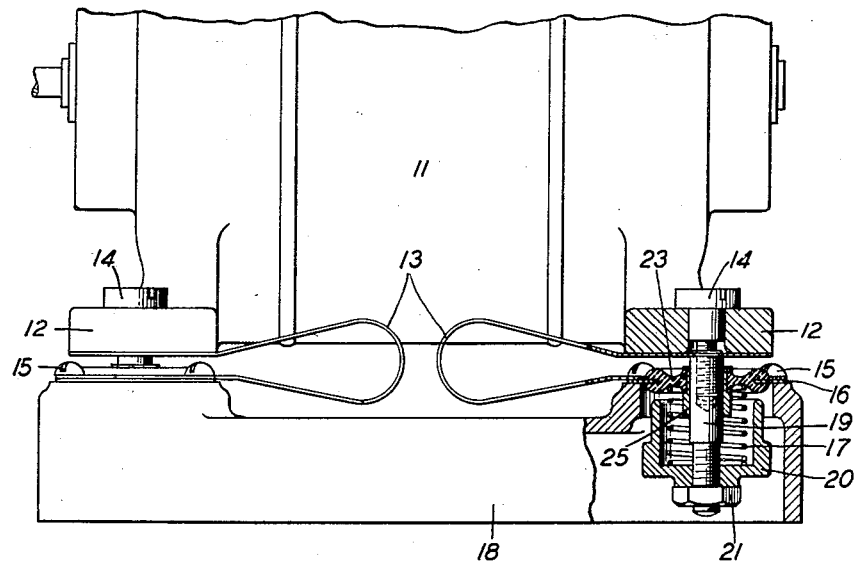

In the drawing the motor 11 having mounting lugs 12 is supported on the base plate 18 by means of the U-shaped spring members 13. For a small motor of the type required in a sound reproducing machine as disclosed in my prior application referred to above, these springs may be formed of No. 22 B & S gauge sheet phosphorus bronze suitably tempered to provide the necessary resiliency. The spring is bent into the form shown and has secured thereto a threaded stud member 19 having a tapped hole in its upper end to receive the set screw 14. The stud member 19 has a slight shoulder where it passes through the upper leaf of the spring 13 and the end of the stud is spun over to form a riveted joint with the spring leaf. The lower leaf of the spring is somewhat wider than the upper leaf and contains a large central opening to provide clearance around the rubber disc 23 of the mounting member 16. Both the lower leaf of the spring and the member 16 are drilled to receive the set screws 15 which secure them to the base plate 18. The mounting member 16 is an instrument mounting of a well known type comprising a rubber disc 23 of a low stiffness in the direction of its vertical axis secured at its periphery to a plate member 24. The disc 23 is provided with a central metal bushing 25 which has no metallic connection with the plate 24 and the stud 19 passes through the bushing with a sliding fit. The helical spring 17 for this purpose may be made up of No. 20 steel music wire with the ends of the spring ground flat as shown. This spring is held under compression against the disc 23 by the cup member 20 and the adjusting nut 21.

While the spring members 13 are identical within the limits of manufacturing accuracy, it is necessary in order to adjust the motor to a perfectly horizontal position to provide a convenient means for varying the normal position of each of the springs. The stiffness of the springs 13 is such that in the absence of the springs 17 the motor will be maintained above the desired working level. The springs 17, however, as already stated are held in compression by the nut 21 and cause the stud member 19 which is secured to the mounting lug 12 to slide downwardly through the bushing 25 to bring the motor to the proper working position. By adjusting each of the nuts 21 independently the motor may be accurately leveled in any desired position.

The combination of springs 13 and 17 is of very low stiffness in a vertical direction so that the vibrations originating in the motor even those of frequencies as low as 60 cycles are effectively damped out and prevented from interfering with the operation of the apparatus to which the motor is connected. The rubber disc 23 is quite stiff laterally as compared with its lateral stiffness so that the motor is maintained in proper alignment without interfering with the damping action of the springs.

Figure 2:
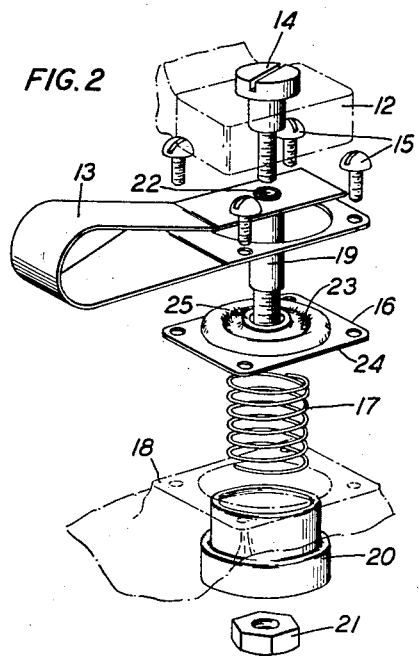
Fig. 2 is an exploded view of the vibration absorbing mounting means.
Figure 3:
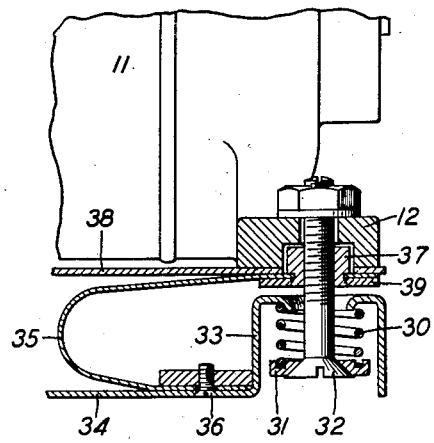
Fig. 3 shows an alternate construction for supporting the motor.

If a very high degree of lateral stability is not required the modified arrangement of Fig. 3 may be used. In this form of the invention no rubber disc is used, the helical spring 30 in this case being compressed between the washer 31 on the bolt 32 and the recessed portion 33 of the base plate 34. The lower leaf of the spring 35 is somewhat shorter than the upper leaf and is clamped directly to the base plate 34 by means of screws 36. The mounting lugs 12 of the motor are preferably recessed as shown to receive the members 37 which are secured to the upper leaf of the spring 35. The spring combinations consisting in this case of the helical spring 30 and the flat spring 35 operate in exactly the same manner as that already described in connection with Fig. 2, and the lower leaf of the spring 35 being somewhat the shorter than in the other construction, this arrangement is sufficiently stable in a lateral direction for many purposes.

For convenience in attaching the motor to the mounting the flat springs may be secured to a mounting plate to maintain proper spacing. In Fig. 3 the same effect is obtained by means of flat metal strips 38 and 39 which interconnect the four springs 35.

What is claimed is:

1. In a vibration dampening mounting, a supported member and a supporting member, a plurality of flat U-shaped springs under compression between the members, mounting bolts, resilient material surrounding the bolts and secured to the supporting member, and helical springs on the bolts cooperating with the resilient material to oppose the U-shaped springs.

2. In a vibration dampening mounting the combination with a base plate and a supported member of flat spring members tending to maintain the member above its proper operating position, non-metallic lateral stabilizing members on the base plate, helical springs and means secured to the supported member for compressing the springs against the stabilizing members to hold the supported member in its proper operating position.

3. In a vibration dampening mounting the combination with a base plate and a supported member of a plurality of rubber discs of high lateral stiffness and U-shaped flat springs attached to the base plate, stud members extending through the discs and being secured to the free end of the springs, helical springs on the stud members, means for compressing the helical springs against the discs to vary the deflection of the flat springs and means for securing the supported member to the studs.

In witness whereof, I hereunto subscribe my name this 18th day of April, 1932.

FRANK H. HIBBARD.